United States Patent
Lee et al.

(10) Patent No.: US 8,805,440 B2
(45) Date of Patent: Aug. 12, 2014

(54) SYSTEM, METHOD, SERVICE SERVER, AND END-POINT TERMINAL FOR PROVIDING RELEVANT SOUND CONTENT

(75) Inventors: Jeong Hoon Lee, Seoul (KR); Jeong Min You, Seoul (KR); In Hwan Kim, Seoul (KR)

(73) Assignee: SK Planet Co., Ltd. (KR)

( * ) Notice: Subject to any disclaimer, the term of this patent is extended or adjusted under 35 U.S.C. 154(b) by 285 days.

(21) Appl. No.: 13/128,487

(22) PCT Filed: Oct. 16, 2009

(86) PCT No.: PCT/KR2009/005956
§ 371 (c)(1),
(2), (4) Date: May 10, 2011

(87) PCT Pub. No.: WO2010/058909
PCT Pub. Date: May 27, 2010

(65) Prior Publication Data
US 2011/0223861 A1    Sep. 15, 2011

(30) Foreign Application Priority Data

Nov. 20, 2008  (KR) .................. 10-2008-0115796

(51) Int. Cl.
*H04M 1/00*   (2006.01)
*H04B 5/00*   (2006.01)
*G06F 15/16*  (2006.01)

(52) U.S. Cl.
USPC .................. 455/556.1; 455/41.1; 709/219

(58) Field of Classification Search
USPC .............. 455/552.1, 41.1–41.3, 185.1, 414.1, 455/466, 556.1; 370/329, 338, 341, 345, 370/347; 709/224, 203, 252, 338, 217–219
See application file for complete search history.

(56) References Cited

U.S. PATENT DOCUMENTS

| | | | |
|---|---|---|---|
| 2001/0003542 A1* | 6/2001 | Kita | 381/334 |
| 2001/0013062 A1* | 8/2001 | Ono | 709/218 |
| 2002/0062467 A1* | 5/2002 | Hunzinger | 714/749 |
| 2003/0075036 A1* | 4/2003 | Isozaki et al. | 84/602 |
| 2008/0261525 A1* | 10/2008 | Matsuo et al. | 455/41.2 |
| 2009/0111378 A1* | 4/2009 | Sheynman et al. | 455/41.1 |
| 2009/0138547 A1* | 5/2009 | Boudreau | 709/203 |
| 2009/0164514 A1* | 6/2009 | Svendsen et al. | 707/104.1 |

FOREIGN PATENT DOCUMENTS

| | | |
|---|---|---|
| JP | 2002-073493 | 3/2002 |
| JP | 2003-223167 | 8/2003 |
| JP | 2004-110093 | 4/2004 |
| JP | 2004-171291 | 6/2004 |
| JP | 2006-133877 | 5/2006 |
| KR | 1020020069145 | 8/2002 |
| KR | 10-2005-0061412 | 6/2005 |
| KR | 100747695 | 8/2007 |

* cited by examiner

*Primary Examiner* — Andrew Wendell
*Assistant Examiner* — Cindy Trandai
(74) *Attorney, Agent, or Firm* — Baker & Hostetler LLP

(57) ABSTRACT

The present invention relates to a system and method for providing relevant sound content from an end-point terminal. The invention enables music files in the end-point terminal to be utilized in various kinds of sounds used while using a mobile communication terminal with the system including the end point terminal, the mobile communication terminal, and a service server. The mobile communication terminal is connected to the end-point terminal through a local area network and to the service server through a mobile communication network and is in charge of data transmission between the end-point terminal and the service server for downloading the relevant sound content from the service server which transmits the relevant sound content corresponding to the music file to the mobile communication terminal.

8 Claims, 5 Drawing Sheets

SYSTEM, METHOD, SERVICE SERVER, AND END-POINT TERMINAL FOR PROVIDING RELEVANT SOUND CONTENT

TECHNICAL FIELD

The present invention relates to a system, method, a service server, and an end-point terminal for providing relevant sound content and, more particularly, to technology in which part of or the entire music file being played or stored in an end-point terminal can be used in various kinds of sounds used while a mobile communication terminal is in use.

BACKGROUND ART

With the development of information communication technology, a variety of end-point terminals, such as a Mpeg audio layer-3 (MP3) player, a Personal Multimedia Player (PMP), and an Ultra Mobile Personal Computer (UMPC) which are capable of playing documents, images, and moving images (hereinafter, unless otherwise described, 'documents, images, and moving images' are simply called 'content', for convenience of description), are being used. A user downloads desired content from a Personal Computer (PC) on to the end-point terminal and plays the downloaded content. There is a problem in that the desired content cannot be downloaded while a user is moving or when the user cannot access a PC.

In order to solve the problem, there has been proposed technology in which communication means capable of accessing a near-field communication network, such as bluetooth or UltraWideBand (UWB), is added to an end-point terminal and the end-point terminal and a mobile communication terminal are connected over the near-field communication network.

Meanwhile, in order to handle various tastes and needs of a user, a mobile communication terminal uses various sound effects (the sound effects include all sound effects, such as ring tones, incoming ring tones, and operating sounds) which may be used while the mobile communication terminal is in use). The sound effects are basically provided by a manufacturer, but there is a problem in that the provided sound effects cannot handle all tastes and needs of users. In order to handle various tastes and needs of users, communication companies or partners continuously generate and supply the sound effects. A user searches for, downloads, and uses a desired sound effect by manipulating the Internet or a mobile communication terminal.

Meanwhile, a user may want part of or the entire music file, being heard or stored, to be in the sound effects of a mobile communication terminal, while listening to music through an end-point terminal. In this case, the user searches a sound effect corresponding to the music file being heard or stored ('a sound effect corresponding a music file being heard or stored' is hereinafter simply called 'relevant sound content') using a computer or the mobile communication terminal. If there is a search result, the user downloads the sound effect and uses the downloaded sound effect. If there is no search result, the user has to provide the music file of the end-point terminal to a service server, download the relevant sound content generated by the service server, and use the downloaded sound content. This makes a user inconvenient in using relevant sound content because the user has to perform lots of steps. In order to solve the problem, there has been proposed technology for converting a music file into relevant sound content for use in a mobile communication terminal in the form of a program executable in a computer. This method is however problematic in that it requires a user to have a high level of knowledge of a computer or a file structure.

DISCLOSURE

Technical Problem

Accordingly, the present invention has been made in view of the above problems occurring in the prior art, and it is an object of the present invention to provide technology in which part of or the entire music file, being played by a user through an end-point terminal or stored in the end-point terminal, is provided as relevant sound content that may be used in a mobile communication terminal.

Technical Solution

To achieve the above object, a system for providing relevant sound content according to an embodiment of the present invention includes an end-point terminal connected to a mobile communication terminal over a near-field communication network and configured to request a service server to send relevant sound content, corresponding to a music file being played or stored and used while the mobile communication terminal is in use, to the mobile communication terminal; the mobile communication terminal connected to the end-point terminal over the near-field communication network to the service server over the mobile communication network and configured to be responsible for the transfer of data between the end-point terminal and the service server to download the relevant sound content from the service server and to use the downloaded relevant sound content; and the service server connected to the mobile communication terminal over the mobile communication network and configured to receive a relevant sound content transmission request from the end-point terminal and to transmit the relevant sound content, corresponding to the music file, to the mobile communication terminal.

In the present embodiment, the end-point terminal may transfer part of the music file to the service server, and the service server may generate the relevant sound content based on part of the received music file.

In the present embodiment, the system further includes an application server connected to the service server over a wired communication network and configured to send a sound source, corresponding to the music file, to the service server. The end-point terminal may transfer offset information indicative of a section of the music file to the service server. The service server may search the application server for the sound source based on the offset information and generate the relevant sound content for the section, corresponding to the offset information, from the retrieved sound source.

In the present embodiment, the system may further include a billing server connected to the service server over the mobile communication network or a wired communication network and configured to perform billing for the mobile communication terminal when the relevant sound content is provided from the service server to the mobile communication terminal.

To achieve the above object, according to another embodiment of the present invention, there is provided a method of providing relevant sound content using a system in which an end-point terminal is connected to a mobile communication terminal over a near-field communication network, the mobile communication terminal and a service server are connected together over a mobile communication network, and the service server and an application server are connected together over a wired communication network, including the steps of a) the end-point terminal being connected to the service server over the mobile communication terminal; b) the end-point terminal requesting the service server to provide relevant sound content related to a music file thereto; c) the end-point terminal sending music file information to the service server; d) the service server generating the relevant sound content based on the music file information; and e) the service server sending the generated relevant sound content to the mobile communication terminal.

In the present embodiment, the method may further include the step d-1) of converting the relevant sound content, generated at the step d), according to hardware specifications of the mobile communication terminal.

In the present embodiment, at the step b), the end-point terminal may transfer part of the music file to the service server, and at the step d), the service server may generate the relevant sound content using part of the received music file.

In the present embodiment, at the step b), the end-point terminal may transfer offset information indicative of a section of the music file to the service server, and at the step d), the service server may search the application server for a sound source and generate the relevant sound content for the section, corresponding to the offset information, from the retrieved sound source.

In the present embodiment, the method may further include the step f) of the service server sending a result message to the end-point terminal.

To achieve the above object, a service server for providing a relevant sound content according to further yet another embodiment of the present invention includes a communication unit for transmitting and receiving data over a mobile communication network; a mobile communication terminal management unit for managing mobile communication terminal information received through the communication unit; an end-point terminal management unit for managing end-point terminal information received through the communication unit; a near-field communication network management unit for managing near-field communication network information to relay communication between the mobile communication terminal and an end-point terminal; a storage unit for storing the mobile communication terminal information, the end-point terminal information, and the near-field communication network information; and a control unit for controlling operations of the respective elements and for, when a relevant sound content transmission request is received from the end-point terminal, generating a relevant sound content based on a music file received from the end-point terminal and controlling the relevant sound content generated by the communication unit so that the generated relevant sound content is transmitted to the mobile communication terminal.

In the present embodiment, the control unit may determine whether to convert the relevant sound content based on hardware specification information of the mobile communication terminal, managed by the mobile communication terminal management unit and may further perform an operation of converting the relevant sound content if, as a result of the determination, the relevant sound content needs to be converted.

In the present embodiment, when only offset information indicative of a section of the music file is received from the end-point terminal, the control unit may search an application server for a sound source and generate the relevant sound content for the section, corresponding to the offset information, from the retrieved sound source.

To achieve the above object, an end-point terminal for requesting relevant sound content according to further yet another embodiment of the present invention includes a communication unit for transmitting and receiving data over a near-field communication network; an input unit for receiving a command of a user; a play unit for playing a music file; and a control unit for controlling operations of the respective elements and sending a message, requesting relevant sound content for the music file to be transmitted to a mobile communication terminal, to a service server via the mobile communication terminal in response to the user command received through the input unit.

In the present embodiment, the control unit may control the communication unit so that the communication unit sends part of the music file to the service server.

In the present embodiment, the control unit may control the communication unit so that the communication unit sends offset information indicative of a section of the music file to the service server.

Figure 1:
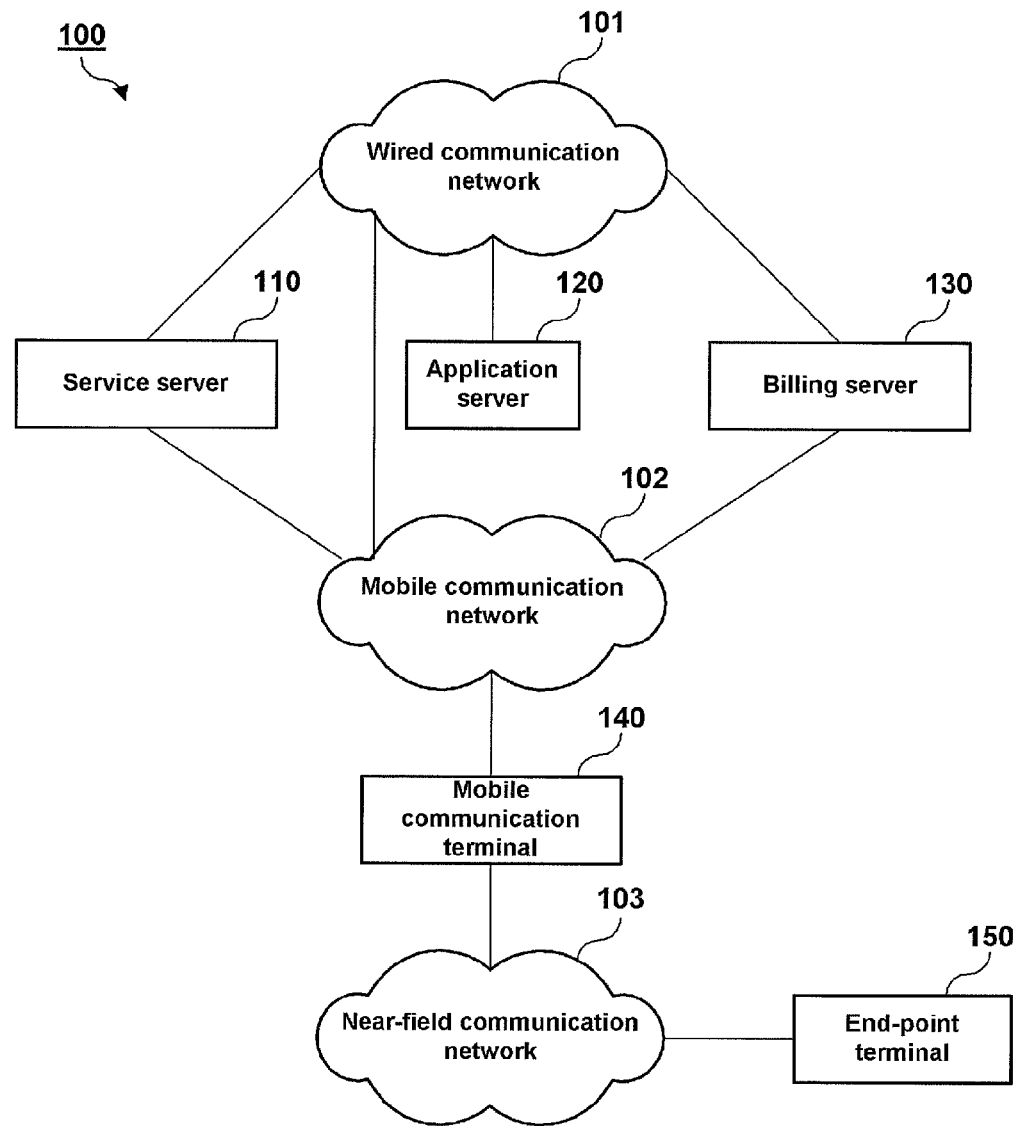
FIG. 1 is a block diagram of a providing system according to an embodiment of the present invention.

<Description of reference numerals of principal elements in the drawings>

| | |
|---|---|
| 100: providing system | 101: wired communication network |
| 102: mobile communication network | |
| 103: near-field communication network | |
| 110: service server | 120: application server |
| 130: billing server | 140: mobile communication terminal |
| 150: end-point terminal | |

MODE FOR INVENTION

Embodiments of the present invention will now be described in detail with reference to the accompanying drawings.

In describing the present invention, when a detailed description of the known functions or structures is determined to unnecessarily obscure the subject matter of the present invention, the detailed description will be omitted. Furthermore, the following terms have been defined by taking their functions in the present invention into consideration and may be varied according to an intention of a user who uses a product or usual practices. Accordingly, the definition of the terms should be made based on the contents of the entire specification.

Figure 2:
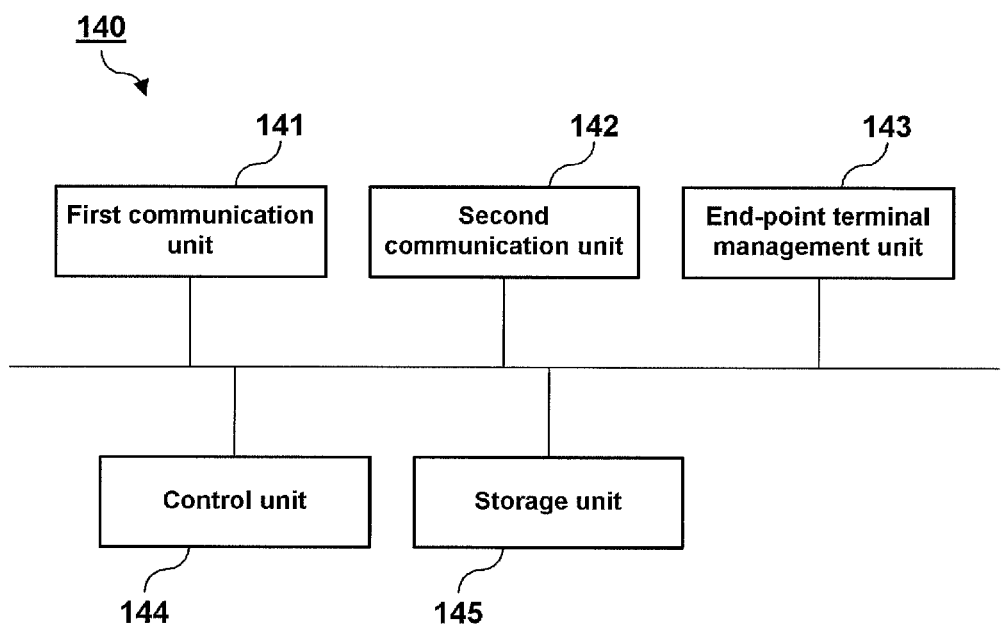
FIG. 2 is a detailed block diagram of a mobile communication terminal in FIG. 1.
Figure 6:
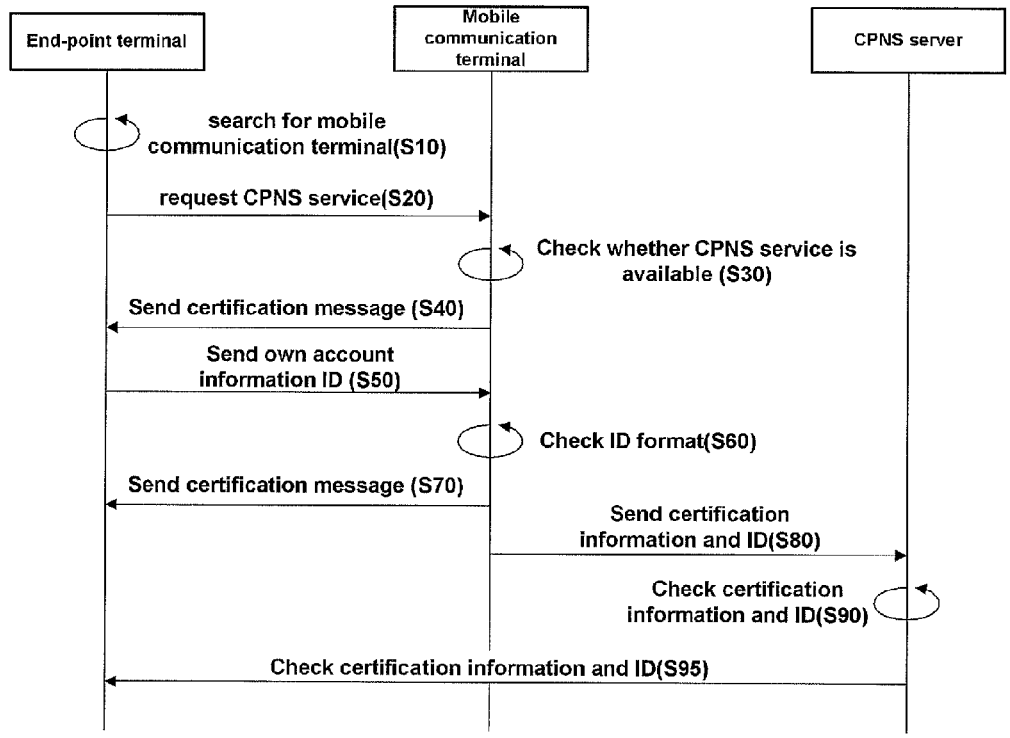
FIG. 6 is a flowchart illustrating an initial setup process for the present invention.

First, a system for providing relevant sound content according to an embodiment of the present invention is descried with reference to FIGS. 1, 2, and 6.

Figure 3:
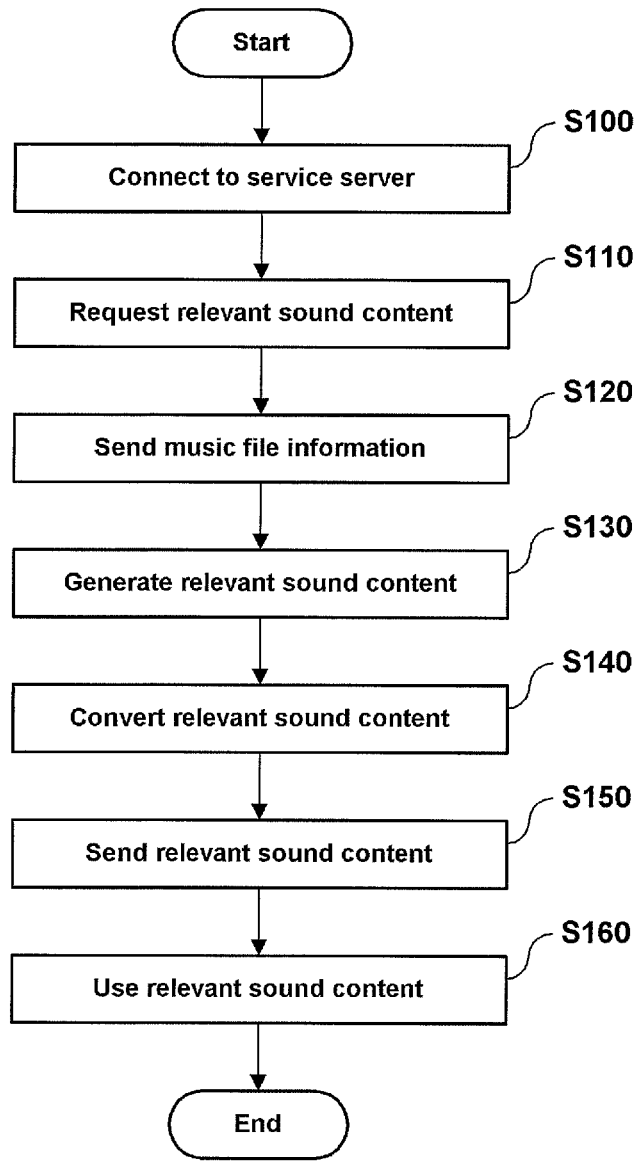
FIG. 3 is a flowchart of a method of providing relevant sound content according to an embodiment of the present invention.

FIG. 1 is a block diagram of the providing system according to an embodiment of the present invention, FIG. 2 is a detailed block diagram of a mobile communication terminal in FIG. 1, and FIG. 3 is a flowchart of a providing method according to an embodiment of the present invention.

Here, the system 100 proposed by the present invention experiences an initial setup process shown in FIG. 6 for the recommendation of an efficient connection path.

At a first step, an end-point terminal 150 searches for a mobile communication terminal which plays the role of a gateway connected to a service server 110 in order to use service at step S10.

At a second step, the end-point terminal 150 request the mobile communication terminal, retrieved at the first step, from the service. Here, the end-point terminal also sends account information for the service use at step S20.

At a third step, when the service request transmitted by the end-point terminal is received, the mobile communication terminal checks whether the end-point terminal 150 can use the service at step S30.

At a fourth step, if, as a result of the check at the third step, the end-point terminal 150 can use the service, the mobile communication terminal sends a certification message, informing that the service is available, to the end-point terminal 150 at step S40. Meanwhile, if, as a result of the check at the third step, the service is impossible, the mobile communication terminal sends a service-impossible message to the end-point terminal and terminates the process.

At a fifth step, the end-point terminal 150 sends his own account information (ID) at step S50.

At a sixth step, the mobile communication terminal checks whether a format of the account information received from the end-point terminal 150 is identical with one issued by the service server at step S60. If, as a result of the check, the format of the account information is identical with the one issued by the service server, the mobile communication terminal sends a certification message, informing that the service is possible, to the end-point terminal 150 at step S70. If, as a result of the check, the format of the account information is not identical with the one issued by the service server, the mobile communication terminal sends a service-impossible message to the end-point terminal and terminates the process.

At a seventh step, the mobile communication terminal sends its own certification information and account information and the certification information and account information about the end-point terminal 150 to the service server 110 at step S80.

At an eighth step, the service server 110 determines whether the service is possible by checking the account information at step S90.

At a ninth step, if both the mobile communication terminal and the end-point terminal 150 can use the service, the service server 110 informs the end-point terminal of the fact so that the service can be used at step S95.

As shown in FIG. 1, the system 100 for providing relevant sound content (hereinafter simply referred to as 'the relevant sound content providing system', unless otherwise described, for convenience of description) according to the present embodiment has a configuration in which the service server 110, an application server 120, and a billing server 130 are connected together over a wired communication network 101 or a mobile communication network 102 or both, the service server 110 and the mobile communication terminal 140 are connected together over the mobile communication network 102, and the mobile communication terminal 140 and the end-point terminal 150 are connected together over a near-field communication network 103. Here, a WLAN, bluetooth, UWB, and so on may be used. Furthermore, the application server 120 or the billing server 130 or both may be included as some of the elements of the service server 110.

The end-point terminal 150 requests the service server 110 to send relevant sound content, corresponding to a music file being played or stored and used while the mobile communication terminal 140 is in use, to the mobile communication terminal 140. A MP3 player, a PMP, or a UMPC equipped with a communication unit for connecting to the near-field communication network 103 may be used as the end-point terminal 150. Here, the relevant sound content refers to sound effects, such as ring tones, incoming ring tones, and operating sounds which may be used while the mobile communication terminal is in use. It is to be noted that in the entire specification, 'the relevant sound content' refers to some sections of a music file. The end-point terminal 150 may send offset information, indicating part of a music file or the section of a music file, to the service server 110 as music file information.

The mobile communication terminal 140 is responsible to the transfer of data between the end-point terminal 150 and the service server 110, downloads relevant sound content from the service server 110, and uses the downloaded relevant sound content. The construction of the mobile communication terminal 140 is described below with reference to FIG. 2. A first communication unit 141 sends and receives data over the mobile communication network 102. A second communication unit 142 sends and receives data over the near-field communication network 103. In order to handle various kinds of near-field communication networks, the second communication unit 142 may comply with two or more near-field communication network communication standards. An end-point terminal management unit 143 stores end-point terminal information. A control unit 144 controls the operations of the respective elements. A storage unit 145 stores end-point terminal information.

The service server 110 receives a request to send relevant sound content from the end-point terminal 150 and sends the relevant sound content, corresponding to a music file, to the mobile communication terminal 140. When part of a music file is received as music file information from the end-point terminal 150, the service server 110 generates relevant sound content on the basis of the music file information. Furthermore, when offset information indicative of the section of a music file is received as music file information, the service server 110 may search the application server 120 for a sound source on the basis of the offset information and generate relevant sound content for a section, corresponding to the offset information, from the retrieved sound source.

The application server 120 sends the sound source, corresponding to the music file, to the service server 110.

When the relevant sound content is provided from the service server 110 to the mobile communication terminal 140, the billing server 130 performs billing for the mobile communication terminal 140.

Hereinafter, a method of providing relevant sound content according to an embodiment of the present invention is described with reference to FIG. 3.

FIG. 3 is a flowchart of the method of providing relevant sound content according to the embodiment of the present invention.

As shown in FIG. 3, the method of providing relevant sound content ('the method of providing relevant sound content' is hereinafter simply referred to as 'the providing method', unless otherwise described, for convenience of description) according to the present embodiment is applied to a system in which an end-point terminal is connected to a mobile communication terminal over a near-field communication network, the mobile communication terminal and the service server are connected together over a mobile communication network, and a service server and an application server are connected together over a wired communication network.

At a first step, the end-point terminal is connected to the service server via the mobile communication terminal at step S100.

At a second step, the end-point terminal requests the service server to provide relevant sound content for a music file thereto at step S110.

At a third step, the end-point terminal sends music file information to the service server at step S120. Here, the transmitted music file information may become offset information indicative of part of the music file or the section of the music file.

At a fourth step, the service server generates the relevant sound content on the basis of the music file information at step S130. At the third step, when part of the music file is received, the service server generates the relevant sound content using part of the music file. Meanwhile, when the offset information is received at the third step, the service server searches the application server for a sound source and generates the relevant sound content, corresponding to a section corresponding to the offset information, from the retrieved sound source.

At a fifth step, the service server converts the relevant sound content according to hardware specifications of the mobile communication terminal at step S140. The mobile communication terminal has a variety of the hardware specifications according to a manufacturer, the data of manufacture, and so on. Accordingly, the service server has to convert the relevant sound content in the form of a format which can be recognized and used in the mobile communication terminal.

At a sixth step, the service server sends the relevant sound content to the mobile communication terminal at step S150. After the transmission is completed, the service server may send a result message to the end-point terminal.

At a seventh step, the mobile communication terminal uses the received relevant sound content at step S160.

Hereinafter, the service server for providing relevant sound content according to an embodiment of the present invention is described with reference to FIG. 4.

Figure 4:
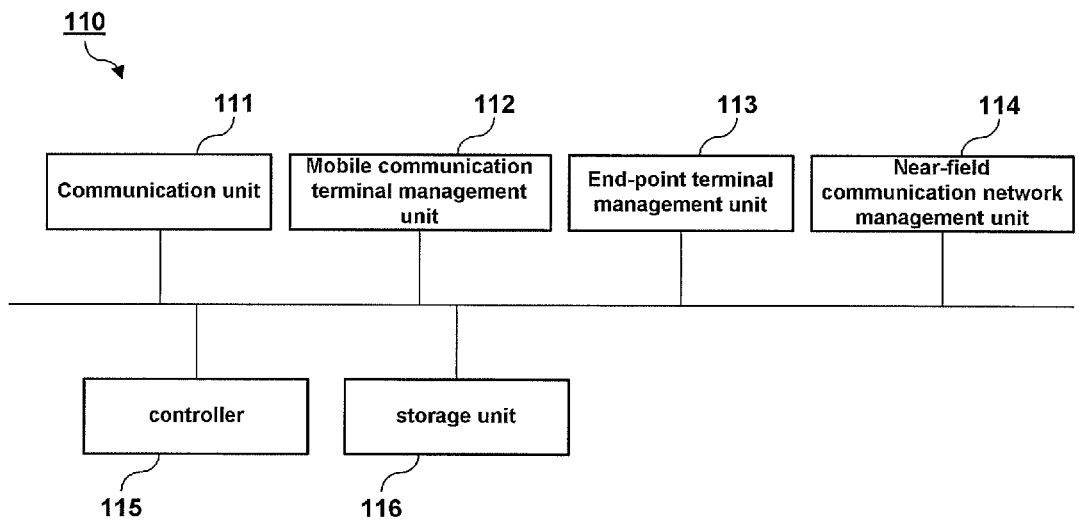
FIG. 4 is a detailed block diagram of a service server according to an embodiment of the present invention.

FIG. 4 is a detailed block diagram of the service server according to the embodiment of the present invention.

As shown in FIG. 4, in the service server 110 for providing relevant sound content ('the service server for providing relevant sound content' is simply referred to as 'the service server', unless otherwise described, for convenience of description) according to the present embodiment, a communication unit 111 transmits and receives data over the mobile communication network.

A mobile communication terminal management unit 112 manages mobile communication terminal information received through the communication unit 111. The managed mobile communication terminal information may include a type of a mobile communication terminal, a hardware specification, mobile communication terminal user information, a type of a user fare, and so on.

An end-point terminal management unit 113 manages information about a first end-point terminal and a second end-point terminal received through the communication unit 111. The managed end-point terminal information may include a type of an end-point terminal, a hardware specification, an end-point terminal-unique account, and so on.

A near-field communication network management unit 114 manages information about the near-field communication which relays communication between the mobile communication terminal and the end-point terminal. The managed near-field communication network information may include the specification of a communication network, a login account when a login is required, and so on.

A storage unit 116 stores the mobile communication terminal information, the end-point terminal information, and the near-field communication network information.

A control unit 115 controls the operations of the respective elements. When a relevant sound content transmission request is received from the end-point terminal, the control unit 115 generates relevant sound content on the basis of a music file, received from the end-point terminal, and controls the relevant sound content generated by the communication unit 111 such that the generated relevant sound content is transmitted to the mobile communication terminal. Here, the control unit 115 determines whether to convert the relevant sound content based on the hardware specification information of the mobile communication terminal managed by the mobile communication terminal management unit 112. If, as a result of the determination, the relevant sound content is needed to be converted, the control unit 115 preferably further performs an operation of converting the relevant sound content. Furthermore, when the control unit 115 receives only offset information indicative of only the section of a music file from the end-point terminal, the control unit 115 searches the application server for a sound source and generates the relevant sound content for a section, corresponding to the offset information, from the retrieved sound source.

Hereinafter, the end-point terminal to request relevant sound content request according to an embodiment of the present invention is described with reference to FIG. 5.

Figure 5:
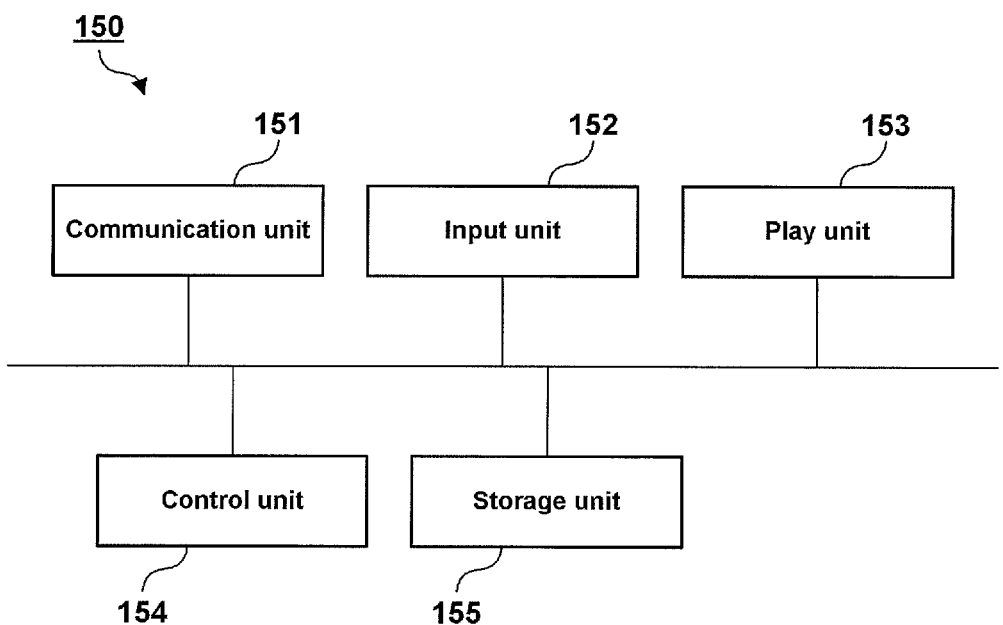
FIG. 5 is a detailed block diagram of an end-point terminal according to an embodiment of the present invention.

FIG. 5 is a detailed block diagram of the end-point terminal according to the embodiment of the present invention.

As shown in FIG. 5, in the end-point terminal 150 to request relevant sound content ('the end-point terminal to request relevant sound content' is hereinafter simply referred to as 'the end-point terminal', unless otherwise described, for convenience of description) according to the present embodiment, a communication unit 151 transmits and receives data over the near-field communication network.

An input unit 152 receives a command from a user. Input means, such as a switch, a keypad, a keyboard, or a touch screen, may be used as the input unit 152.

A play unit 153 plays a music file.

A control unit 154 controls the operations of the respective elements and transmits a message, requesting relevant sound content for a music file to be transmitted to the mobile communication terminal, to the service server via the mobile communication terminal in response to the user command received through the input unit 151. Here, the control unit 154 may control the communication unit 151 so that the communication unit 151 sends part of the music file to the service server and may control offset information indicative of the section of the music file so that the offset information is transmitted to the service server. In the case where part of the music file is transmitted, the process of searching the application server for a sound source and downloading the sound source may be omitted. In the case where the offset information is transmitted, there is an advantage in that the amount of data transmitted from the end-point terminal to the service server can be reduced.

Hereinafter, an application example of the present invention is described with reference to FIG. 7.

Figure 7:
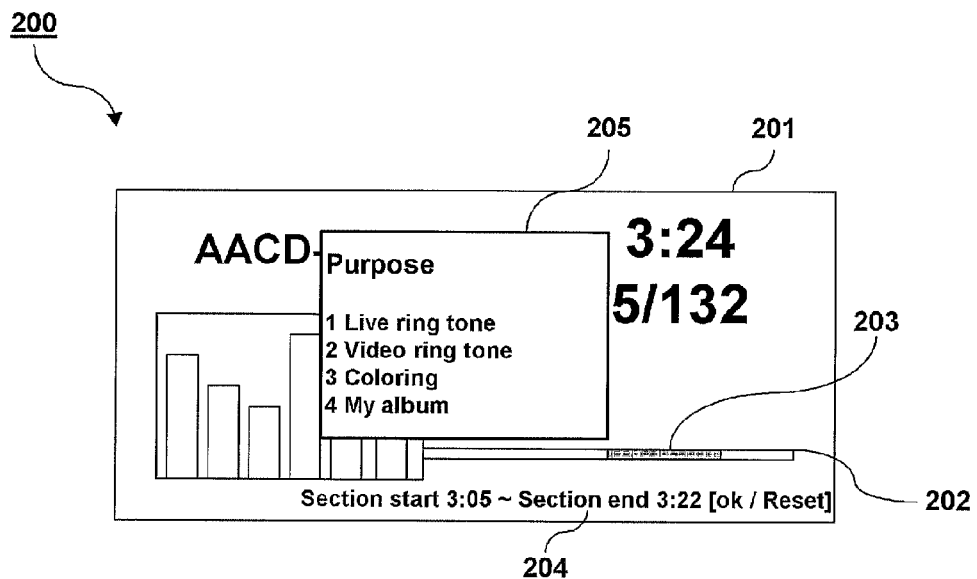
FIG. 7 is a diagram showing the display of a display device in the end-point terminal according to an application example of the present invention.

FIG. 7 is a diagram showing the display of a display device in the end-point terminal according to the application example of the present invention.

At a first step, a user plays a music file through the end-point terminal.

At a second step, if the user is satisfactory with part of the music file and wants to use part of the music file as a sound effect of the mobile communication terminal, the user selects a predetermined section of the music file by manipulating the end-point terminal. The state at this time is shown in FIG. 7. As shown in FIG. 7, a content information display region 201, a bar 202 indicative of a section, and a section 203 selected by a user are displayed in the display device 200 of the end-point terminal. Meanwhile, the displayed section may be displayed (204) so that the user can easily check the section. When the user selects the section, a pop-up window 205 is displayed. The user selects a desired operation in the contents of the pop-up window 205 by touching a screen or manipulating the input unit.

At a third step, the user sends a predetermined section file of the music file or offset information to the service server via the mobile communication terminal and requests the service server to provide relevant sound content thereto.

At a fourth step, when the service server receives the predetermined section file of the music file, the service server generates the relevant sound content based on the predetermined section file and converts the generated relevant sound content according to the hardware specifications of the mobile communication terminal.

At a fifth step, the service server sends the relevant sound content to the mobile communication terminal and sends a result message to the end-point terminal.

At a sixth step, the user who has received the result message applies the relevant sound content, transmitted to the mobile communication terminal, as a sound effect which is used while the mobile communication terminal is in use.

At a seventh step, when the service server receives the offset information, the service server searches the application server for a sound source, separates a section, corresponding to the offset information, from the sound source, generates the relevant sound content based on the separated section, and converts the generated relevant sound content according to the hardware specification of the mobile communication terminal. A subsequent process is performed in the same manner as the fifth step and the sixth step.

Accordingly, the user can use a sound, corresponding to a specific position of a music file, as a sound effect of the mobile communication terminal even without knowledge of a high level of computer manipulating technology or file.

The embodiments of the present invention have been described above with reference to the accompanying drawings. It is however to be noted that the present invention is not specially limited to the above-described embodiments and those skilled in the art may change or modify the embodiments in various ways without departing from the scope and spirit of the present invention.

INDUSTRIAL APPLICABILITY

According to the present invention, there is provided technology in which a user can be provided with relevant sound content that can be used in the mobile communication terminal, by only transmitting part of or the entire music file, being played or stored, or offset information to the service server through the end-point terminal.

The invention claimed is:

1. A system for providing relevant sound content comprising:
    an end-point terminal connected to a mobile communication terminal over a near-field communication network and configured to request a service server via the mobile communication terminal which is connected to the service server over a mobile communication network to send relevant sound content, corresponding to a music file being played or stored and used while the mobile communication terminal is in use, to the mobile communication terminal;
    the mobile communication terminal connected to the end-point terminal over the near-field communication network and to the service server over a mobile communication network for transferring data between the end-point terminal and the service server to download the relevant sound content from the service server and to use the downloaded relevant sound content;
    the service server connected to the mobile communication terminal over the mobile communication network to receive the relevant sound content transmission request from the end-point terminal and to transmit the relevant sound content, corresponding to the music file, to the mobile communication terminal; and
    an application server connected to the service server over a wired communication network to send a sound source, corresponding to the music file, to the service server,
    wherein when the end-point terminal transfers part of the music file to the service server the service server generates the relevant sound content based on the received file, and when the end-point terminal transfers offset information indicative of a section of the music file to the service server, the service server searches the application server for the sound source based on the offset information and generates the relevant sound content for the section, corresponding to the offset information, from the retrieved sound source.

2. The system as claimed in claim 1, further comprising a billing server connected to the service server over the mobile communication network or a wired communication network and configured to perform billing for the mobile communication terminal when the relevant sound content is provided from the service server to the mobile communication terminal.

3. A service server for providing a relevant sound content, comprising;
    a communication unit for transmitting and receiving data over a mobile communication network;
    a mobile communication terminal management unit for managing mobile communication terminal information received through the communication unit;
    an end-point terminal management unit for managing end-point terminal information received through the communication unit;
    a near-field communication network management unit for managing near-field communication network information to relay communication between the mobile communication terminal and an end-point terminal;
    a storage unit for storing the mobile communication terminal information, the end-point terminal information, and the near-field communication network information; and
    a control unit for controlling operations of the communication unit, input unit and play unit respectively and when a relevant sound content transmission request is received from the end-point terminal, generating a relevant sound content based on a music file received from the end-point terminal and controlling the communication unit so that the generated relevant sound content is transmitted to a mobile communication terminal;

wherein when part of the music file is received from the end-point terminal, the control unit generates the relevant sound content based on part of the received music file, and when only offset information indicative of a section of the music file is received from the end-point terminal, the control unit searches an application server for a sound source and generates the relevant sound content for the section, corresponding to the offset information, from the retrieved sound source.

4. The service server as claimed in claim 3, wherein the control unit determines whether to convert the relevant sound content based on hardware specification information of the mobile communication terminal, managed by the mobile communication terminal management unit and further performs an operation of converting the relevant sound content if, as a result of the determination, the relevant sound content needs to be converted.

5. An end-point terminal for requesting relevant sound content, comprising;
   a communication unit for transmitting and receiving data over a near-field communication network;
   an input unit for receiving a command of a user;
   a play unit for playing a music file; and
   a control unit for controlling operations of the communication unit, input unit and play unit respectively and for sending a message, requesting relevant sound content for the music file to be transmitted to a mobile communication terminal, to a service server via the mobile communication terminal connected to the service server over a mobile communication network, in response to the user command received through the input unit,
   wherein the control unit controls the communication unit so that the communication unit sends part of the music file or offset information indicative of a section of the music file to the service server, and
   wherein the service server generates the relevant sound content based on the received file.

6. A method of providing relevant sound content using a system in which an end-point terminal is connected to a mobile communication terminal over a near-field communication network, the mobile communication terminal and a service server are connected together over a mobile communication network, and the service server and an application server are connected together over a wired communication network, the method comprising the steps of;
   a) the end-point terminal being connected to the service server via the mobile communication terminal;
   b) the end-point terminal requesting the service server via the mobile communication terminal connected to the service server over the mobile communication network to provide relevant sound content related to a music file thereto;
   c) the end-point terminal sending music file information to the service server via the mobile communication terminal connected to the service server over the mobile communication network;
   d) the service server generating the relevant sound content based on the music file information; and
   e) the service server sending the generated relevant sound content to the mobile communication terminal;
   wherein at the step b), if the end-point terminal transfers part of the music file to the service server, then at the step d), the service server generates the relevant sound content using part of the received music file, and
   wherein at the step b), if the end-point terminal transfers offset information indicative of a section of the music file to the service server, then at the step d), the service server searches the application server for a sound source and generates the relevant sound content for the section, corresponding to the offset information, from the retrieved sound source.

7. The method as claimed in claim 6, further comprising the step d-1) of converting the relevant sound content, generated at the step d), according to hardware specifications of the mobile communication terminal.

8. The method as claimed in claim 6, further comprising the step f) of the service server sending a result message to the end-point terminal.

* * * * *